United States Patent
Wolfe et al.

(10) Patent No.: US 7,739,696 B2
(45) Date of Patent: Jun. 15, 2010

(54) MESSAGE TRANSLATION SYSTEMS AND METHODS

(75) Inventors: Jeffrey M. Wolfe, Parrish, FL (US); Jason L. Copenhaver, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 1218 days.

(21) Appl. No.: 11/222,211

(22) Filed: Sep. 8, 2005

(65) Prior Publication Data

US 2007/0067471 A1    Mar. 22, 2007

(51) Int. Cl.
*G06F 13/00* (2006.01)
*G06F 9/45* (2006.01)
*G06F 17/00* (2006.01)

(52) U.S. Cl. .................. 719/328; 717/136; 717/137; 717/140; 717/143; 715/236; 715/239; 715/249

(58) Field of Classification Search .................. 719/328; 717/136, 137, 140, 143; 715/249, 236, 239
See application file for complete search history.

(56) References Cited

U.S. PATENT DOCUMENTS

| | | |
|---|---|---|
| 5,142,681 A | 8/1992 | Driscoll et al. |
| 5,175,817 A | 12/1992 | Adams et al. |
| 5,339,434 A | 8/1994 | Rusis |
| 5,406,557 A | 4/1995 | Baudoin |
| 5,586,330 A | 12/1996 | Knudsen et al. |
| 5,592,656 A | 1/1997 | Canzone |
| 5,596,744 A | 1/1997 | Dao et al. |
| 5,701,423 A | 12/1997 | Crozier |
| 6,367,076 B1 | 4/2002 | Imai et al. |
| 6,598,052 B1 | 7/2003 | Saulpaugh et al. |
| 6,606,632 B1 | 8/2003 | Saulpaugh et al. |
| 6,609,130 B1 | 8/2003 | Saulpaugh et al. |
| 6,675,377 B1 | 1/2004 | Tanaka |

(Continued)

FOREIGN PATENT DOCUMENTS

EP    1441292    7/2004

(Continued)

OTHER PUBLICATIONS

Nicolle, Christophe et al., XML Integration and Toolkit for B2B Applications, Journal of Database Management, Oct. 1, 2003, pp. 33-58, vol. 14, No. 4, Publisher: Idea Group Publishing, Published in: US.

*Primary Examiner*—Van H Nguyen
*Assistant Examiner*—Phuong N Hoang
(74) *Attorney, Agent, or Firm*—Fogg & Powers LLC

(57) ABSTRACT

Message translation systems and methods are provided. In one embodiment, a method for translating messages comprises reading a first sequence of one or more message elements from a first interface, wherein the message elements are structured based on a first protocol; converging on a message mapping node based on the first sequence of one or more message elements, wherein the message mapping node is defined by a protocol metadata schema; performing one or more conversion operations on the first sequence of one or more message elements to construct a second sequence of one or more message elements, wherein the one or more conversion operations are based on the message mapping node; and writing the second sequence of one or more message elements to a second interface.

12 Claims, 6 Drawing Sheets

U.S. PATENT DOCUMENTS

| | | |
|---|---|---|
| 6,775,680 B2 | 8/2004 | Ehrman et al. |
| 6,795,868 B1 | 9/2004 | Dingman et al. |
| 6,970,869 B1 * | 11/2005 | Slaughter et al. ............... 707/10 |
| 7,437,374 B2 * | 10/2008 | Chen et al. ................... 707/101 |
| 2002/0042843 A1 | 4/2002 | Diec |
| 2002/0046294 A1 | 4/2002 | Brodsky et al. |
| 2002/0066091 A1 | 5/2002 | Larsson et al. |
| 2002/0087622 A1 | 7/2002 | Anderson |
| 2002/0100031 A1 | 7/2002 | Miranda et al. |
| 2002/0143913 A1 | 10/2002 | Sahita et al. |
| 2002/0166116 A1 | 11/2002 | Eidt |
| 2003/0051073 A1 | 3/2003 | Mishra et al. |
| 2003/0145312 A1 | 7/2003 | Bates et al. |
| 2003/0195987 A1 | 10/2003 | Krishnamurthy et al. |
| 2003/0220963 A1 | 11/2003 | Golovinsky et al. |
| 2003/0226132 A1 | 12/2003 | Tondreau et al. |
| 2004/0028212 A1 | 2/2004 | Lok et al. |
| 2004/0111464 A1 | 6/2004 | Ho et al. |
| 2004/0111613 A1 | 6/2004 | Shen-Orr et al. |
| 2004/0013081 A1 | 7/2004 | Bhatia et al. |
| 2004/0139231 A1 | 7/2004 | Newman et al. |
| 2004/0172637 A1 | 9/2004 | Koutyrine |
| 2004/0205738 A1 | 10/2004 | Yoshida et al. |
| 2004/0210673 A1 | 10/2004 | Cruciani et al. |
| 2004/0221277 A1 | 11/2004 | Owen et al. |
| 2004/0221292 A1 | 11/2004 | Chiang et al. |
| 2004/0225753 A1 | 11/2004 | Marriott et al. |

FOREIGN PATENT DOCUMENTS

| | | |
|---|---|---|
| EP | 1475702 | 11/2004 |
| EP | 1494241 | 1/2005 |
| JP | 2004253996 | 9/2004 |
| WO | 0049481 | 8/2000 |
| WO | 2004053719 | 6/2004 |

* cited by examiner

MESSAGE TRANSLATION SYSTEMS AND METHODS

TECHNICAL FIELD

The present invention generally relates to communicating messages and more particularly to translating messages between message protocols.

BACKGROUND

Complex systems often comprise multiple data processing devices that input and output message data using any number of messaging protocols. Often, two devices with the need to communicate data to each other cannot do so directly because each communicates using incompatible message protocols. For the reasons stated above and for other reasons stated below which will become apparent to those skilled in the art upon reading and understanding the specification, there is a need in the art for systems and methods for deciphering information from one message protocol and translate the information into another message protocol.

SUMMARY

The Embodiments of the present invention provide methods and systems for message translation and will be understood by reading and studying the following specification.

In one embodiment, a method for translating messages is provided. The method comprises reading a first sequence of one or more message elements from a first interface, wherein the message elements are structured based on a first protocol; converging on a message mapping node based on the first sequence of one or more message elements, wherein the message mapping node is defined by a protocol metadata schema; performing one or more conversion operations on the first sequence of one or more message elements to construct a second sequence of one or more message elements, wherein the one or more conversion operations are based on the message mapping node; and writing the second sequence of one or more message elements to a second interface.

In another embodiment, a message translation engine is provided. The message translation engine comprises a first interface adapted to input a first sequence of one or more message elements; a second interface adapted to output a second sequence of one or more message elements; a processor coupled to the first physical interface and the second physical interface; and a state driver application executing on the processor, the state driver application adapted to read the first sequence of one or more message elements from the first physical interface, identify a message mapping node of a protocol metadata schema based on the first sequence of one or more message elements, and perform one or more conversion operations on the first sequence of one or more message elements to construct a second sequence of one or more message elements, wherein the one or more conversion operations are based on the message mapping node. The state driver is further adapted to output the second sequence of one or more message elements to the second physical interface.

In yet another embodiment, a computer-readable medium having computer-executable program instructions for a method for translating messages is provided. The method comprises reading a first sequence of one or more message elements from a first interface, wherein the message elements are structured based on a first protocol; converging on a protocol metadata schema message mapping node based on the first sequence of one or more message elements; performing one or more conversion operations on the first sequence of one or more message elements to construct a second sequence of one or more message elements, wherein the one or more conversion operations are based on the metadata schema message mapping node; and writing the second sequence of one or more message elements to a second interface.

DRAWINGS

Embodiments of he present invention can be more easily understood and further advantages and uses thereof more readily apparent, when considered in view of the description of the embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
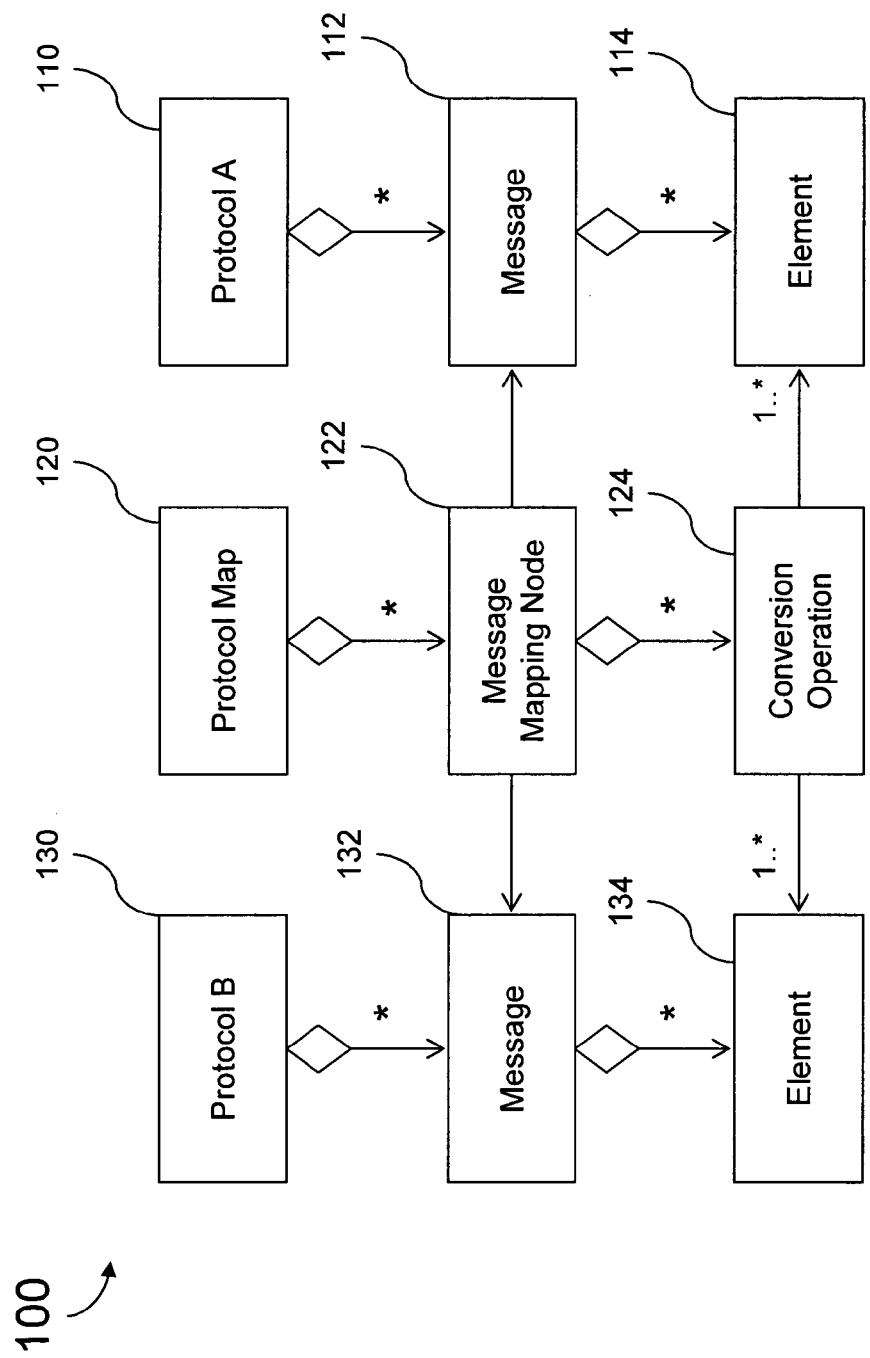
FIG. 1 is diagram illustrating a protocol metadata schema of one embodiment of the present invention.

Embodiments of the present invention convert messages formatted with a first protocol, based on message formats defined by XML protocol metadata files, into messages formatted for a second protocol. Metadata is a form of information that describes the structural format of a data stream. FIG. 1 illustrates a protocol metadata schema 100 of one embodiment of the present invention. In one embodiment, a first protocol for incoming messages, shown as protocol A 110, comprises many different kinds of messages 112. In turn, each of the protocol A messages 112 comprise one or more elements 114. For example, in one embodiment a message in protocol A 110 describing the health status of a device may contain: 1) a start byte identifying the message as a health status message; 2) one or more bytes that identify the subject device; and 3) one or more bytes providing the current health of the device. Similarly, in one embodiment, a second protocol for outgoing messages, shown as protocol B 130, comprises many different kinds of messages 132. In turn, each of the protocol B messages 132 comprise one or more elements 134. Protocol metadata schema 100 associates protocol A messages with protocol B messages through protocol map 120. Protocol map 120 comprises a plurality of message mapping nodes 122 each of which maps one specific protocol A message into an associated protocol B message. Further, each of the message nodes 122 comprise a plurality of conversion operations 124 that convert the elements 114 of a specific protocol A message into the elements 134 of the associate protocol B message. In one embodiment, protocol metadata schema 100 is defined within one or more extensible Markup Language (XML) files. When a new message is added to protocol A, or an existing message removed from protocol A, a system developer need only respectively add or delete a message mapping node 122 and its associated conversion operations 124. Similarly, should system developers desire to alter the way a protocol A message is translated into Protocol B, the developers need only identify the message node 122 corresponding to the protocol A message, and appropriately modify the associated conversion operations 124.

Figure 2:
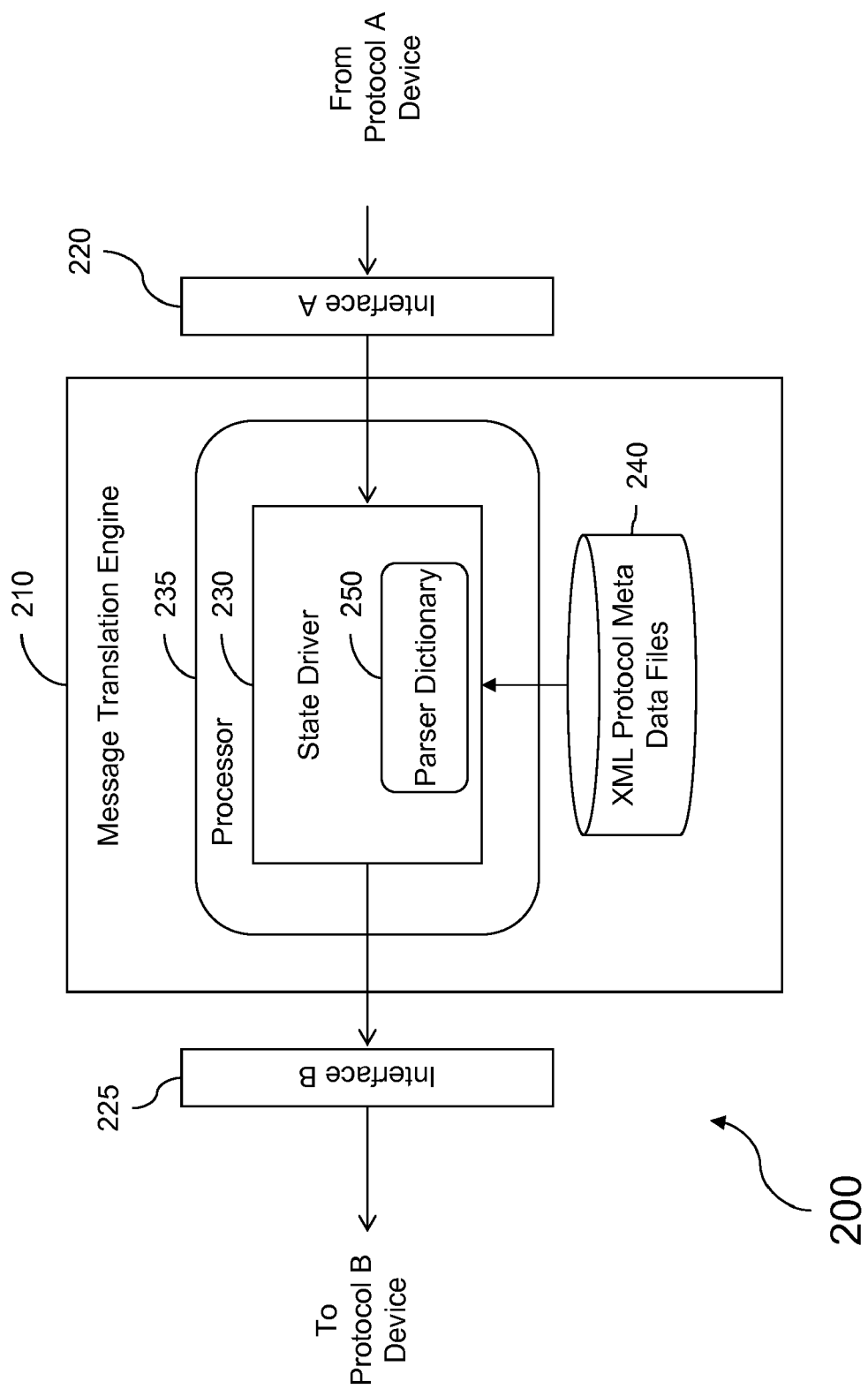
FIG. 2 is a block diagram illustrating a message translation system of one embodiment of the present invention.

Illustrated in FIG. 2 is a message translation system 200 for realizing protocol metadata schema 100 of one embodiment of the present invention. Message translation system 200 comprises a message translation engine 210 having a processor 235 coupled to an input interface 220 and an output interface 225. In one embodiment, input interface 220 and output interface 225 employ different interface standards from each other. In one embodiment, input interface 220 and output interface 225 each comprise one of a serial interface, a raw Ethernet interface, a TCP/IP interface, or an optical data interface. In one embodiment, a state driver 230, executing on processor 230, reads sequential protocol A message elements from input interface 220 and writes sequential protocol B message elements out to output interface 225, based on protocol metadata schema 100.

As would be appreciated by one skilled in the art upon reading this specification, the structured textual format of XML files are readily interpretable and modifiable by human beings skilled in the art. For this reason, XML files are easily reviewed and edited by skilled human beings. However, XML files are not a format optimized for execution by a computer processor. For this reason, XML files comprising protocol metadata schema 100 are compiled into computer executable code as described herein. In one embodiment, message translation system 200 stores protocol metadata schema 100 in one or more XML protocol metadata files 240 coupled to state driver 230. In one embodiment, state driver 230 reads in the protocol metadata stored in XML protocol metadata files 240 during a startup-initialization phase of message translation system 200. State driver 230 then compiles the metadata into a parser dictionary 250. Parser dictionary 250 comprises a distillation of protocol metadata schema 100 into a format readily executable by message translation system 200, such as, but not limited to, a state machine or lookup table.

In one embodiment, in operation, state driver 230 reads a first protocol A message element from input interface 220. Based on information from parser dictionary 250 about that element, state driver 230 determines the allowable elements that can legitimately follow. Additional elements are sequentially read in from input interface 220 until the sequence of elements converges on a single message mapping node 124 of protocol metadata schema 100. Converging onto that single message mapping node 124 identifies the sequence of messages as a unique protocol A message received by message translation system 200. Additionally, convergence on that particular mapping node 124 identifies the protocol B message to output. To construct the appropriate sequence of protocol B message elements, state driver 230 executes each conversion operation 124 defined by the message mapping node on the received sequence of protocol A message elements. State driver 230 writes the resulting sequential protocol B message elements out to output interface 225.

Figure 3:
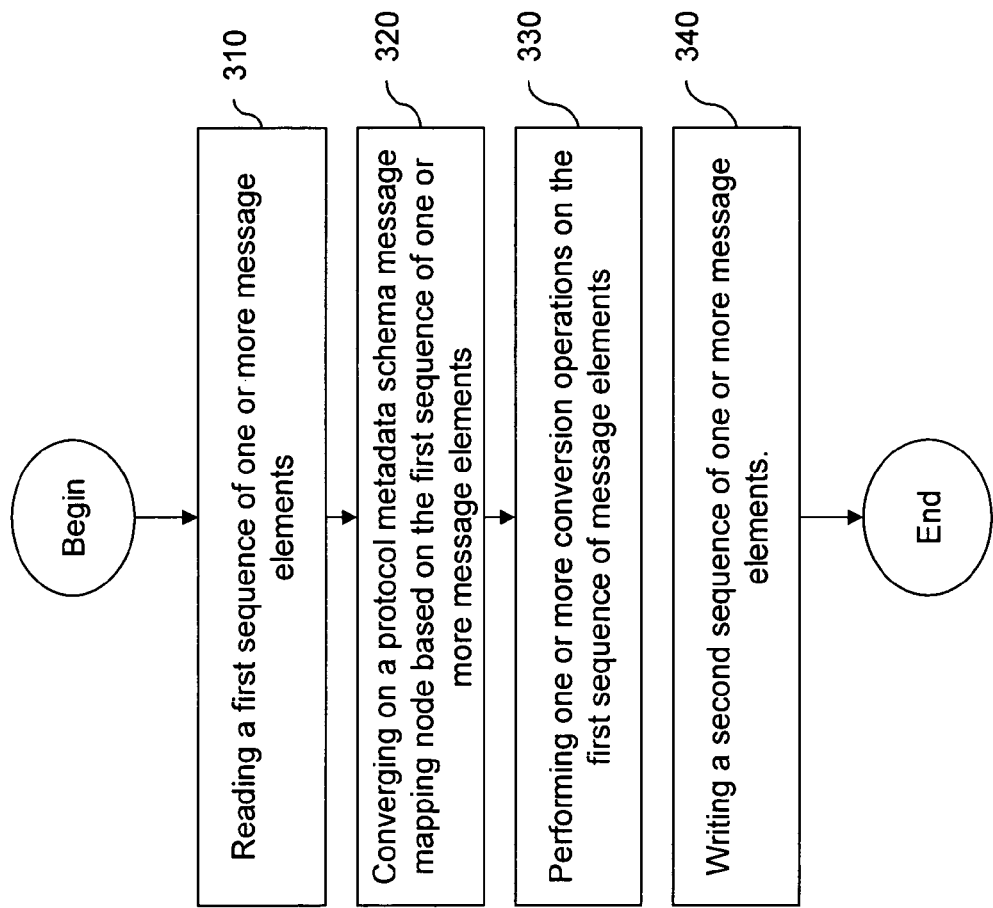
FIG. 3 is a flow chart illustrating a method of one embodiment of the present invention.

FIG. 3 is a flow chart illustrating a method for translating messages of one embodiment of the present invention. The method begins at 310 with reading a first sequence of one or more message elements from a first interface. The message elements are structured based on a first protocol. The method continues at 320 with converging on a protocol metadata schema message mapping node based on the first sequence of one or more message elements. In one embodiment, message elements from the first sequence are provided to a state driver which correlates the sequence of elements to a message mapping nodes of a protocol metadata schema as each element in the sequence is received. When the sequence of element correlates to exactly one message mapping node, the method proceeds to 330 with performing one or more conversion operations on the first sequence of message elements. The conversion operations to perform on the first sequence of message elements is identified by the message mapping node. Performing the one or more conversion operations converts the first sequence of message elements into a second sequence of message elements that form a message in accordance with a second protocol. The method continues to 340 with writing the second sequence of message elements to a second interface. In one embodiment, converging on a protocol metadata schema message mapping node is accomplished by feeding the first sequence of message elements into a parser dictionary state machine until the parser dictionary state machine reaches a terminal state and then correlating the terminal state with the protocol metadata schema message mapping node. In one embodiment, the parser dictionary state machine is created by reading in the protocol metadata schema from one or more XML protocol metadata files and compiling the protocol metadata schema into the parser dictionary. In one embodiment, the terminal state is correlated to a particular mapping node through a lookup table or similar cross referencing tool.

In one embodiment, parser dictionary 250 is a state machine executed by state driver 230 in real time, which enables state driver 230 to begin constructing a protocol B message from a protocol A message, while the protocol A message is being received. Utilizing a state machine allows state driver 230 to construct protocol B messages significantly faster than if state driver 230 referred directly to XML protocol metadata files 240 for each message translation. As would be appreciated by one skilled in the art, a number of traditional parser approaches may be leveraged to build a parser dictionary 250 state machine from protocol metadata schema 100. For example, one common parser generator is the Yet Another Compiler Compiler (YACC) which inputs metadata describing the grammar of input messages and then generates C programming language code for a parser.

Figure 4:
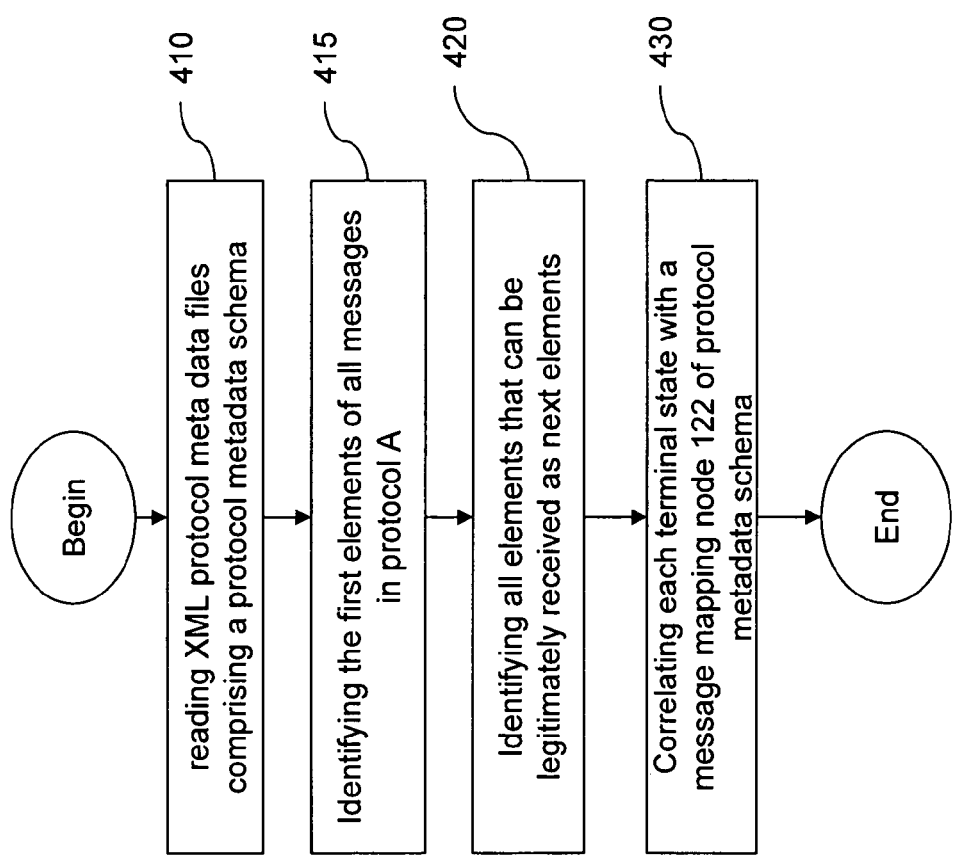
FIG. 4 is a flow chart illustrating a method for constructing a parser dictionary state machine of one embodiment of the present invention.

FIG. 4 is a flow chart illustrating a method for constructing a parser dictionary state machine for protocol metadata schema 100 of one embodiment of the present invention. In one embodiment, the method begins at 410 with reading XML protocol metadata files comprising a protocol metadata schema and then identifying the first elements of all messages in protocol A (415). A set containing these first elements defines a first state. The method continues at 420 with identifying all elements that can be legitimately received as the next elements for each of the previous state's elements until there is no next legitimate element for any element of the previous states. For example, for each of the first elements in the first state, the method identifies all elements that can be legitimately received as the second element. For each of the first elements, the set of all elements that can be legitimately received as the second element defines a second state. Then for each second element, the method identifies all elements that can be legitimately received as third elements. Whether one element can legitimately follow another element is determined by the message syntax define by protocol A. An element having no next legitimate element is defined as residing in a terminal state. The sequence of elements starting from the first state to the terminal state represents the syntax of a unique protocol A message that will correlate with exactly one message mapping node of the protocol metadata schema. Accordingly, the method proceeds to 430 with correlating each terminal state with a message mapping node of the protocol metadata schema.

In one embodiment, in operation, state driver 230 feeds an incoming first sequence of elements into the parser dictionary state machine until the parser dictionary state machine reaches a terminal state. State driver 230 then looks up the message mapping node 122 correlating to the terminal state and executes conversion operations 126 on the first sequence of elements to produce a second sequence of elements forming a protocol B message. State driver 230 then outputs the protocol B message.

As previously mentioned, in one embodiment, state driver 230 recompiles XML protocol metadata files 240 into parser dictionary 250 during a startup-initialization phase of message translation engine 210. This allows system operators to update XML protocol metadata files 240 to reflect modifications in protocol metadata schema 100 without affecting the continuing operation of message translation system 200. When updates to XML protocol metadata files 240 are complete, system operator can then reinitialize message translation engine 210, load and compile the revised XML protocol metadata files 240, and implement the modified protocol metadata schema 100.

Figure 5A:
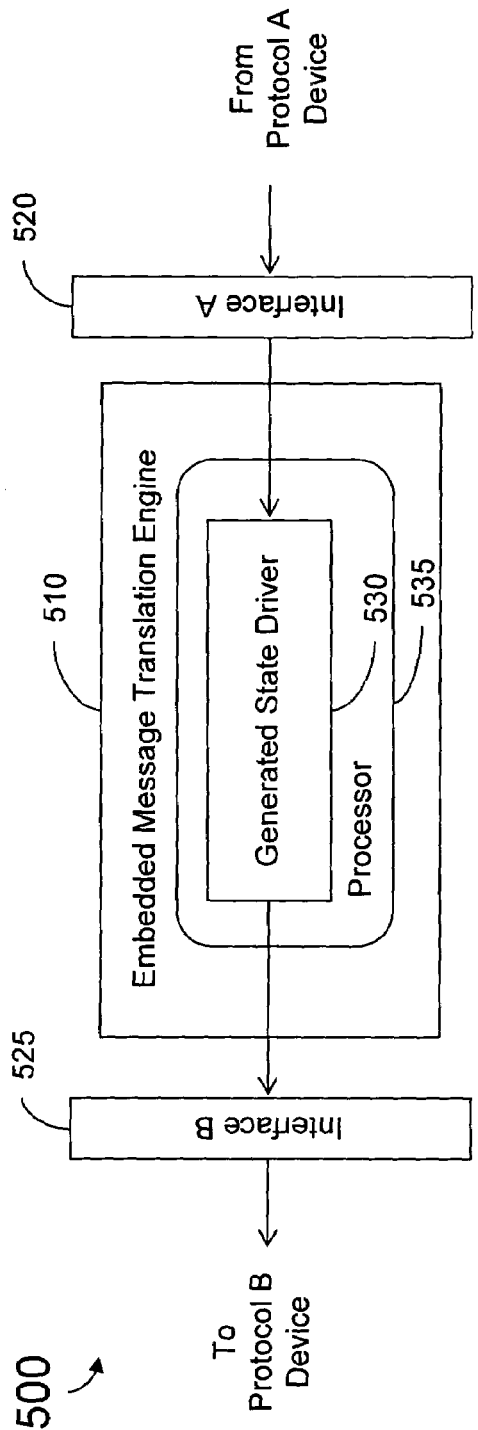
FIGS. 5A and 5B illustrate an embedded message translation system of one embodiment of the present invention.
Figure 5B:
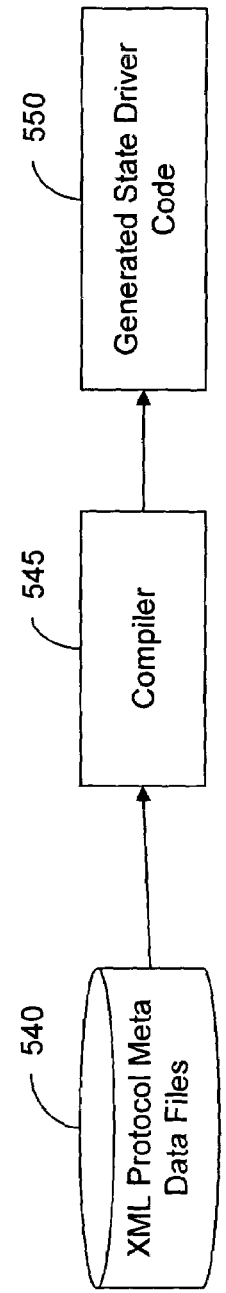

In some applications, a message translation engine such as those discussed above is desired to operate within an embedded system having limited computing capacity. For example, a message translation engine may be desired to translate messages to or from a payload software application executing on a spaced based satellite processor having limited computing power and storage capacity. For many embedded systems, compiling a set of XML protocol metadata files into a parser dictionary exceeds the embedded system's computing capacity. FIG. 5A illustrates one embodiment of an embedded message translation system 500. Message translation system 500 comprises an embedded message translation engine 510 having a processor 535 coupled to an input interface 520 and an output interface 525. A generated state driver 530, executing on processor 535, reads sequential protocol A message elements from input interface 520 and writes sequential protocol B message elements out to output interface 525. In contrast with message translation engine 210, embedded message translation engine 500 does not compile XML protocol metadata files into a parser dictionary. Instead, as illustrated in FIG. 5B, XML protocol metadata files 540, representing protocol metadata schema 100, are compiled by a compiler 545 that is external to message translation system 500. Compiler 545 produces an efficient static implementation of a message translation engine in the form of generated state driver code 550. Generated state driver code 550 is then loaded into embedded message translation engine 510 and executed to realize generated state driver 530. In one embodiment in operation, generated state driver 530 comprises a state machine programmed to construct protocol B message from a sequence of protocol A messages, as discussed with respect to state driver 230 above.

Figure 6:
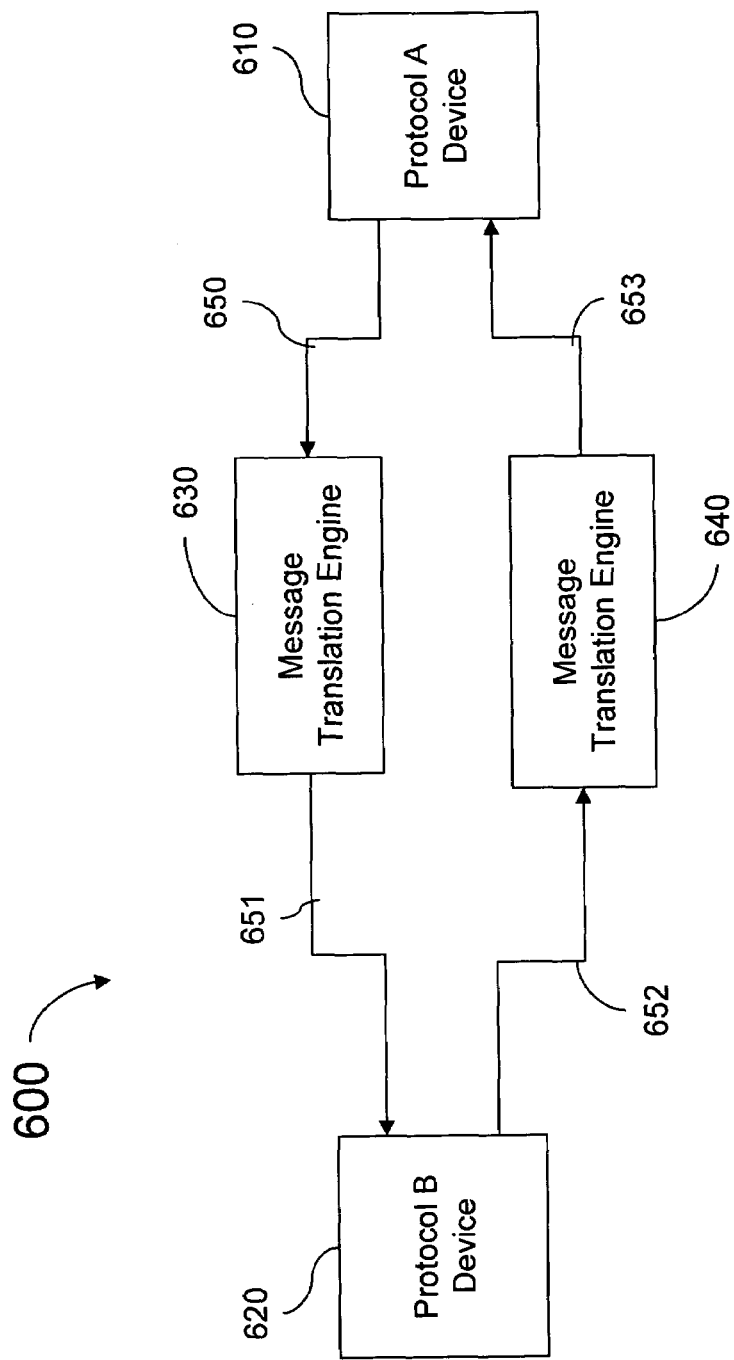
FIG. 6 illustrates a system of one embodiment of the present invention.

FIG. 6 illustrates one embodiment of the present invention of a system 600 for communicating messages between devices designed to communicate with different message protocols. System 600 comprises a protocol A device 610 programmed to send and receive messages using protocol A, and a protocol B device 620 programmed to send and receive messages using protocol B. In order to allow protocol A device 610 to communicate with protocol B device 620, system 600 further comprises a first message translation engine 630 coupled respectively through communication links 650 and 651 to an output of protocol A device 610 and an input of protocol B device 620. Message translation engine 630 reads incoming protocol A messages from protocol A device 610, translates the protocol A messages into protocol B messages as described above, and writes the protocol B messages to protocol B device 620. To allow two way communication, in one embodiment, system 600 further comprises a second message translation engine 640 coupled respectively through communication links 652 and 653 to an output of protocol B device 620 and an input of protocol A device 610. Message translation engine 640 reads incoming protocol B messages from protocol B device 620, translates the protocol B messages into protocol A messages, and writes the protocol A messages to the input of protocol A device 610.

In one embodiment, one or both of protocol A device 610 and protocol B device 620 are embedded within an embedded system such as, but not limited to an orbiting satellite. In that case, in one embodiment, one or more of communications links 650-653 are wireless communications links. In one embodiment, one or both of first message translation engine 630 and second message translation engine 640 are embedded message translation engines as described with respect to FIG. 5.

Several means are available to implement the processors discussed with respect to the current invention. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for translating messages, the method comprising:

reading in a protocol metadata schema from one or more XML protocol metadata files;

compiling the protocol metadata schema into a parser dictionary;

reading a first sequence of one or more message elements from a first interface, wherein the message elements are structured based on a first protocol;

converging on a message mapping node based on the first sequence of one or more message elements, wherein the message mapping node is defined by the protocol metadata schema, the protocol metadata schema associating the first protocol with a second protocol, wherein converging on the message mapping node comprises feeding the first sequence of one or more message elements into a parser dictionary state machine until the parser dictionary state machine reaches a terminal state; and correlating the terminal state with the message mapping node; and performing one or more conversion operations on the first sequence of one or more message elements to construct a second sequence of one or more message elements, wherein the one or more conversion operations are based on the message mapping node and the second sequence of one or more message elements are structured based on the second protocol; and writing the second sequence of one or more message elements to a second interface.

2. The method of claim 1, wherein correlating the terminal state further comprises:

cross referencing the terminal state with the message mapping node on a lookup table.

3. The method of claim 1, wherein converging on the message mapping node further comprises:

feeding the first sequence of one or more message elements into a generated state driver until the state driver identifies the message mapping node.

4. A message translation engine comprising:

a first physical interface configured to input a first sequence of one or more message elements, the first sequence of one or more message elements being structured based on a first protocol;

a second physical interface configured to output a second sequence of one or more message elements, the second sequence of one or more message elements being structured based on a second protocol, wherein a protocol metadata schema associates the first protocol with the second protocol;

a storage device storing one or more metadata files defining a relationship between a first data communications protocol and a second data communications protocol based on the protocol metadata schema;

a processor coupled to the first physical interface and the second physical interface;

a state driver application executing on the processor, the state driver application configured to read the first sequence of one or more message elements from the first physical interface, identify a message mapping node of the protocol metadata schema based on the first sequence of one or more message elements, and perform one or more conversion operations on the first sequence of one or more message elements to construct the second sequence of one or more message elements, wherein the one or more conversion operations are based on the message mapping node; and a parser dictionary running on the processor, the parser dictionary configured to read the first sequence of one or more message elements from the state driver application and correlate the first sequence of one or more message elements with the message mapping node;

wherein the state driver application is further configured to compile the one or more metadata files into the parser dictionary; and wherein the state driver application is further configured to output the second sequence of one or more message elements to the second physical interface.

5. The message translation engine of claim 4, wherein the protocol metadata schema comprises:

a protocol map comprising a plurality of message mapping nodes, wherein each of the message mapping nodes correlates one message of a first protocol to an associated message of a second protocol, and wherein each message mapping node comprises one or more conversion operations configured to convert one or more elements of the one message of the first protocol into one or more elements of the associated message of the second protocol.

6. The message translation engine of claim 4, wherein the one or more metadata files are XML files.

7. The message translation engine of claim 4, wherein the state driver application is generated by a compiler, wherein the compiler inputs one or more metadata files defining a relationship between a first data communications protocol and a second data communications protocol based on a protocol metadata schema to generate the state driver application.

8. The message translation engine of claim 7, wherein the one or more metadata files are XML files.

9. A message protocol translating system, the system comprising:

a first device configured to one or both of input data and output data using a first message protocol;

a second device configured to one or both of input data and output data using a second message protocol, wherein a protocol metadata schema associates the first message protocol with the second message protocol;

a storage device storing one or more metadata files defining a relationship between a first data communications protocol and a second data communications protocol based on the protocol metadata schema;

a first processor coupled to input messages from the first device and output messages to the second device;

a first state driver application executing on the first processor, the first state driver application configured to read a first sequence of one or more message elements from the first device, identify a first message mapping node of the protocol metadata schema based on the first sequence of one or more message elements, and perform one or more conversion operations on the first sequence of one or more message elements to construct a second sequence of one or more message elements, wherein the one or more conversion operations are based on the first message mapping node; and a parser dictionary running on the processor, the parser dictionary configured to read the first sequence of one or more message elements from the first state driver and correlate the first sequence of one or more message elements with the first message mapping node;

wherein the first state driver application is further configured to compile the one or more metadata files into the parser dictionary; and wherein the first state driver application is further configured to output the second sequence of one or more message elements to the second device.

10. The system of claim 9 further comprising:
a second processor coupled to input messages from the second device and output messages to the first device; and
a second state driver application executing on the second processor, the second state driver application configured to read a third sequence of one or more message elements from the second device, identify a second message mapping node of the protocol metadata schema based on the third sequence of one or more message elements, and perform one or more conversion operations on the third sequence of one or more message elements to construct a fourth sequence of one or more message elements, wherein the one or more conversion operations are based on the second message mapping node;
wherein the second state driver application is further configured to output the fourth sequence of one or more message elements to the first device.

11. The system of claim 9, wherein the protocol metadata schema comprises:
a protocol map comprising a plurality of message mapping nodes, wherein each of the message mapping nodes correlates one message of a first protocol to an associated message of a second protocol, and wherein each message mapping node comprises one or more conversion operations configured to convert one or more elements of the one message of the first protocol into one or more elements of the associated message of the second protocol.

12. A computer-readable storage medium having computer-executable program instructions, executable by a processor, for a method for translating messages, the method comprising:

reading in a protocol metadata schema from one or more XML protocol metadata files;

compiling the protocol metadata schema into a parser dictionary;

reading a first sequence of one or more message elements from a first interface, wherein the first sequence of one or more message elements are structured based on a first protocol, wherein the protocol metadata schema associates the first protocol with a second protocol;

converging on a protocol metadata schema message mapping node based on the protocol metadata schema and based on the first sequence of one or more message elements, wherein converging on the protocol metadata schema message mapping node comprises feeding the first sequence of one or more message elements into a parser dictionary state machine until the parser dictionary state machine reaches a terminal state; and correlating the terminal state with the message mapping node; and performing one or more conversion operations on the first sequence of one or more message elements to construct a second sequence of one or more message elements, wherein the one or more conversion operations are based on the protocol metadata schema message mapping node and the second sequence of one or more message elements are structured based on the second protocol; and writing the second sequence of one or more message elements to a second interface.

* * * * *